(12) United States Patent
Haugh

(10) Patent No.: US 8,352,091 B2
(45) Date of Patent: Jan. 8, 2013

(54) DISTRIBUTED GRID-INTERACTIVE PHOTOVOLTAIC-BASED POWER DISPATCHING

(75) Inventor: Julianne F. Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/348,042

(22) Filed: Jan. 2, 2009

(65) Prior Publication Data

US 2010/0174418 A1    Jul. 8, 2010

(51) Int. Cl.
*G05D 3/12* (2006.01)

(52) U.S. Cl. ........ 700/286; 700/297; 323/234; 323/259; 323/268; 363/97; 363/71; 363/106; 363/109; 307/150; 307/18; 307/72; 307/85

(58) Field of Classification Search .......... 700/286–291, 700/295–298; 705/412
See application file for complete search history.

(56) References Cited

U.S. PATENT DOCUMENTS

| | | | |
|---|---|---|---|
| 4,085,334 A * | 4/1978 | Shinohara et al. .............. | 307/11 |
| 4,235,221 A | 11/1980 | Murphy | |
| 4,251,735 A * | 2/1981 | Coleman ......................... | 307/46 |
| 4,251,736 A * | 2/1981 | Coleman ......................... | 307/46 |
| 4,528,457 A * | 7/1985 | Keefe et al. ..................... | 307/46 |
| 4,620,283 A | 10/1986 | Butt et al. | |
| 5,225,712 A * | 7/1993 | Erdman .......................... | 290/44 |
| 5,430,430 A | 7/1995 | Gilbert | |
| 5,619,204 A * | 4/1997 | Byrne et al. .................. | 341/155 |
| 5,659,465 A * | 8/1997 | Flack et al. ...................... | 363/71 |
| 5,808,881 A * | 9/1998 | Lee ................................. | 363/37 |
| 6,111,767 A * | 8/2000 | Handleman ..................... | 363/95 |
| 6,118,678 A * | 9/2000 | Limpaecher et al. .......... | 363/60 |
| 6,128,204 A * | 10/2000 | Munro et al. ................... | 363/41 |
| 6,134,124 A * | 10/2000 | Jungreis et al. ................ | 363/34 |
| 6,194,794 B1 * | 2/2001 | Lampe et al. ................... | 307/68 |
| 6,215,199 B1 * | 4/2001 | Lysenko et al. ................ | 290/44 |
| 6,219,623 B1 * | 4/2001 | Wills ............................. | 702/60 |
| 6,281,601 B1 * | 8/2001 | Edelman et al. ................ | 307/29 |
| 6,282,104 B1 * | 8/2001 | Kern ............................... | 363/34 |
| 6,404,075 B1 * | 6/2002 | Potter et al. .................... | 307/64 |
| 6,404,655 B1 * | 6/2002 | Welches ......................... | 363/41 |
| 6,487,096 B1 * | 11/2002 | Gilbreth et al. ................ | 363/35 |
| 6,522,031 B2 * | 2/2003 | Provanzana et al. ........... | 307/48 |

(Continued)

OTHER PUBLICATIONS

El-Tamaly, H.H.; and Mohammed, Adel., "Optimal Operation of Photovoltaic/Utility Grid Interconnected Electrical Power System Using Neural Network", Dec. 2006, 11th Intl. Middle East Power System Conference, vol. 1, p. 317-322.*

(Continued)

*Primary Examiner* — Mohammad Ali
*Assistant Examiner* — Kelvin Booker
(74) *Attorney, Agent, or Firm* — Francis Lammes; Stephen J. Walder, Jr.; John D. Flynn

(57) ABSTRACT

In one embodiment, each of a plurality of sites may produce surplus power. All or a fraction of the surplus power may be supplied to the power grid according to an agreement between the user of a site and an electric utility. A computer of the utility is in communication with a computer at each of a plurality of sites having a local power source. Terms of power provision that include an amount of power to be provided during a specified time of day is communicated between a site and the utility.

6 Claims, 5 Drawing Sheets

U.S. PATENT DOCUMENTS

| | | | |
|---|---|---|---|
| 6,541,139 B1* | 4/2003 | Cibuzar | 429/2 |
| 6,681,156 B1 | 1/2004 | Weiss | |
| 6,757,590 B2* | 6/2004 | Ross et al. | 700/286 |
| 6,765,315 B2* | 7/2004 | Hammerstrom et al. | 307/66 |
| 6,785,592 B1 | 8/2004 | Smith et al. | |
| 6,812,586 B2* | 11/2004 | Wacknov et al. | 290/52 |
| 6,865,685 B2 | 3/2005 | Hammond et al. | |
| 6,900,566 B2 | 5/2005 | Misaki | |
| 6,925,361 B1 | 8/2005 | Sinnock | |
| 6,963,802 B2 | 11/2005 | Enis et al. | |
| 7,000,395 B2* | 2/2006 | Wai et al. | 60/698 |
| 7,042,110 B2* | 5/2006 | Mikhail et al. | 290/44 |
| 7,043,380 B2 | 5/2006 | Rodenberg, III | |
| 7,051,529 B2 | 5/2006 | Murphy et al. | |
| 7,064,969 B2* | 6/2006 | West | 363/132 |
| 7,071,579 B2* | 7/2006 | Erdman et al. | 290/55 |
| 7,099,169 B2* | 8/2006 | West et al. | 363/132 |
| 7,117,044 B2 | 10/2006 | Kocher et al. | |
| 7,142,949 B2 | 11/2006 | Brewster et al. | |
| 7,231,280 B2* | 6/2007 | Costa | 700/286 |
| 7,231,281 B2* | 6/2007 | Costa | 700/286 |
| 7,262,694 B2* | 8/2007 | Olsen et al. | 340/531 |
| 7,274,974 B2 | 9/2007 | Brown et al. | |
| 7,274,975 B2 | 9/2007 | Miller | |
| 7,276,807 B2* | 10/2007 | Luetze et al. | 290/44 |
| 7,280,377 B2* | 10/2007 | Johnson | 363/97 |
| 7,319,313 B2* | 1/2008 | Dickerson et al. | 323/288 |
| 7,324,361 B2* | 1/2008 | Siri | 363/95 |
| 7,372,709 B2* | 5/2008 | Mazumder et al. | 363/16 |
| 7,397,142 B1 | 7/2008 | Cooper | |
| 7,476,987 B2* | 1/2009 | Chang | 290/55 |
| 7,499,762 B2* | 3/2009 | Khorramshahi | 700/22 |
| 7,519,658 B1 | 4/2009 | Anglin et al. | |
| 7,521,914 B2* | 4/2009 | Dickerson et al. | 323/288 |
| 7,590,472 B2* | 9/2009 | Hakim et al. | 700/295 |
| 7,605,498 B2* | 10/2009 | Ledenev et al. | 307/80 |
| 7,608,937 B1* | 10/2009 | Altenschulte | 290/44 |
| 7,645,931 B2* | 1/2010 | Gibson et al. | 136/244 |
| 7,680,548 B2* | 3/2010 | Khorramshahi | 700/22 |
| 7,719,140 B2* | 5/2010 | Ledenev et al. | 307/80 |
| 7,719,864 B2* | 5/2010 | Kernahan et al. | 363/65 |
| 7,783,390 B2 | 8/2010 | Miller | |
| 7,797,084 B2 | 9/2010 | Miwa | |
| 7,800,248 B2* | 9/2010 | Kramer et al. | 307/65 |
| RE41,821 E* | 10/2010 | Ross et al. | 700/286 |
| 7,834,580 B2* | 11/2010 | Haines | 320/101 |
| 7,843,085 B2* | 11/2010 | Ledenev et al. | 307/80 |
| 7,855,906 B2* | 12/2010 | Klodowski et al. | 363/97 |
| RE42,039 E* | 1/2011 | West et al. | 363/132 |
| 7,890,436 B2* | 2/2011 | Kremen | 705/412 |
| 7,919,953 B2* | 4/2011 | Porter et al. | 323/222 |
| 7,925,552 B2* | 4/2011 | Tarbell et al. | 705/30 |
| 7,929,325 B2* | 4/2011 | de Rooij et al. | 363/71 |
| 7,929,327 B2* | 4/2011 | Haines et al. | 363/95 |
| 7,932,633 B2* | 4/2011 | King et al. | 307/45 |
| 8,004,116 B2* | 8/2011 | Ledenev et al. | 307/80 |
| 8,008,808 B2* | 8/2011 | Seeker et al. | 307/72 |
| 8,013,472 B2* | 9/2011 | Adest et al. | 307/77 |
| 8,019,697 B2* | 9/2011 | Ozog | 705/412 |
| 8,027,179 B2* | 9/2011 | Hallak | 363/98 |
| 8,058,752 B2* | 11/2011 | Erickson et al. | 307/150 |
| 8,219,259 B2* | 7/2012 | Haugh | 700/295 |
| 2002/0014802 A1* | 2/2002 | Cratty | 307/43 |
| 2002/0036430 A1 | 3/2002 | Welches et al. | 307/18 |
| 2002/0084655 A1* | 7/2002 | Lof et al. | 290/44 |
| 2002/0171397 A1 | 11/2002 | Adrian et al. | |
| 2003/0007369 A1* | 1/2003 | Gilbreth et al. | 363/35 |
| 2003/0041037 A1 | 2/2003 | Spool et al. | |
| 2003/0167105 A1 | 9/2003 | Colborn | |
| 2004/0158360 A1* | 8/2004 | Garland et al. | 700/286 |
| 2004/0165408 A1* | 8/2004 | West et al. | 363/131 |
| 2005/0165511 A1* | 7/2005 | Fairlie | 700/286 |
| 2006/0208571 A1* | 9/2006 | Fairlie | 307/11 |
| 2006/0277457 A1 | 12/2006 | Salkind et al. | |
| 2007/0100506 A1 | 5/2007 | Teichmann | |
| 2007/0185729 A1* | 8/2007 | Segerman | 705/1 |
| 2007/0276547 A1 | 11/2007 | Miller | |
| 2007/0282495 A1* | 12/2007 | Kempton et al. | 701/22 |
| 2008/0021976 A1 | 1/2008 | Chen et al. | |
| 2008/0046387 A1 | 2/2008 | Gopal et al. | |
| 2008/0091626 A1* | 4/2008 | Kremen | 705/412 |
| 2008/0114499 A1 | 5/2008 | Hakim et al. | |
| 2008/0143188 A1* | 6/2008 | Adest et al. | 307/82 |
| 2008/0167756 A1 | 7/2008 | Golden et al. | |
| 2008/0172346 A1* | 7/2008 | Kremen et al. | 705/412 |
| 2008/0222097 A1 | 9/2008 | Jania et al. | |
| 2008/0258470 A1* | 10/2008 | Khoo et al. | 290/1 A |
| 2008/0272934 A1* | 11/2008 | Wang et al. | 340/870.11 |
| 2009/0012917 A1* | 1/2009 | Thompson et al. | 705/412 |
| 2009/0048716 A1 | 2/2009 | Marhoefer | |
| 2009/0076661 A1 | 3/2009 | Pearson et al. | |
| 2009/0078300 A1* | 3/2009 | Ang et al. | 136/244 |
| 2009/0093916 A1* | 4/2009 | Parsonnet et al. | 700/286 |
| 2009/0094345 A1 | 4/2009 | Kang et al. | |
| 2009/0112935 A1 | 4/2009 | Hefta-Gaub | |
| 2009/0147554 A1* | 6/2009 | Adest et al. | 363/71 |
| 2009/0160259 A1* | 6/2009 | Naiknaware et al. | 307/82 |
| 2009/0172635 A1 | 7/2009 | Auriemma et al. | |
| 2009/0177548 A1* | 7/2009 | Eisenlohr | 705/14 |
| 2009/0179500 A1* | 7/2009 | Ragonese et al. | 307/82 |
| 2009/0187499 A1 | 7/2009 | Mulder et al. | |
| 2009/0206666 A1* | 8/2009 | Sella et al. | 307/43 |
| 2009/0210269 A1* | 8/2009 | Sade | 705/7 |
| 2009/0210329 A1* | 8/2009 | Sade | 705/30 |
| 2009/0216910 A1* | 8/2009 | Duchesneau | 709/250 |
| 2009/0217287 A1 | 8/2009 | Blum et al. | |
| 2009/0234685 A1* | 9/2009 | Tarbell et al. | 705/7 |
| 2009/0234750 A1* | 9/2009 | Arfin | 705/26 |
| 2009/0240449 A1 | 9/2009 | Gibala et al. | |
| 2009/0276263 A1 | 11/2009 | Deb et al. | |
| 2009/0276500 A1 | 11/2009 | Karmarkar | |
| 2009/0281673 A1* | 11/2009 | Taft | 700/286 |
| 2009/0281674 A1* | 11/2009 | Taft | 700/286 |
| 2009/0326729 A1* | 12/2009 | Hakim et al. | 700/295 |
| 2010/0010939 A1* | 1/2010 | Arfin et al. | 705/412 |
| 2010/0017045 A1* | 1/2010 | Nesler et al. | 700/296 |
| 2010/0057480 A1* | 3/2010 | Arfin et al. | 705/1 |
| 2010/0057544 A1* | 3/2010 | Tarbell et al. | 705/14.1 |
| 2010/0076615 A1* | 3/2010 | Daniel et al. | 700/293 |
| 2010/0076835 A1* | 3/2010 | Silverman | 705/14.33 |
| 2010/0094479 A1 | 4/2010 | Keefe | |
| 2010/0097827 A1* | 4/2010 | Ben-Yaakov | 363/65 |
| 2010/0117452 A1* | 5/2010 | Dunnmon et al. | 307/72 |
| 2010/0127576 A1* | 5/2010 | Ahlborn et al. | 307/151 |
| 2010/0133911 A1* | 6/2010 | Williams et al. | 307/82 |
| 2010/0145542 A1 | 6/2010 | Chapel et al. | |
| 2010/0145884 A1 | 6/2010 | Paik | |
| 2010/0148587 A1* | 6/2010 | Khaligh | 307/72 |
| 2010/0157632 A1* | 6/2010 | Batten et al. | 363/74 |
| 2010/0157638 A1* | 6/2010 | Naiknaware et al. | 363/131 |
| 2010/0174418 A1 | 7/2010 | Haugh | |
| 2010/0191489 A1 | 7/2010 | Zolot | |
| 2010/0198421 A1 | 8/2010 | Fahimi et al. | |
| 2010/0207455 A1* | 8/2010 | Erickson et al. | 307/82 |
| 2010/0217642 A1* | 8/2010 | Crubtree et al. | 705/8 |
| 2010/0222935 A1 | 9/2010 | Forbes et al. | 700/291 |
| 2010/0250014 A1 | 9/2010 | Taft | |
| 2010/0253150 A1* | 10/2010 | Porter et al. | 307/82 |
| 2010/0293045 A1 | 11/2010 | Burns et al. | |
| 2010/0306027 A1* | 12/2010 | Haugh | 705/10 |
| 2010/0308662 A1* | 12/2010 | Schatz et al. | 307/80 |
| 2010/0312412 A1 | 12/2010 | Haugh | |
| 2011/0010018 A1 | 1/2011 | Haugh | |
| 2011/0043160 A1* | 2/2011 | Serban | 320/101 |
| 2011/0067745 A1* | 3/2011 | Ledenev et al. | 136/244 |
| 2011/0084553 A1* | 4/2011 | Adest et al. | 307/63 |
| 2011/0084647 A1* | 4/2011 | Haines | 320/101 |
| 2011/0089886 A1* | 4/2011 | Dubovsky | 320/101 |
| 2011/0121652 A1* | 5/2011 | Sella et al. | 307/43 |
| 2011/0169449 A1* | 7/2011 | King et al. | 320/109 |
| 2011/0172837 A1* | 7/2011 | Forbes, Jr. | 700/291 |
| 2011/0172841 A1* | 7/2011 | Forbes, Jr. | 700/292 |
| 2011/0173110 A1* | 7/2011 | Tarbell et al. | 705/34 |
| 2011/0204720 A1* | 8/2011 | Ruiz et al. | 307/66 |
| 2011/0231028 A1* | 9/2011 | Ozog | 700/291 |
| 2011/0285205 A1* | 11/2011 | Ledenev et al. | 307/63 |
| 2012/0032515 A1* | 2/2012 | Ledenev et al. | 307/63 |

| | | | | |
|---|---|---|---|---|
| 2012/0065805 A1* | 3/2012 | Montalvo | | 700/297 |
| 2012/0095813 A1* | 4/2012 | Case | | 705/14.1 |
| 2012/0143384 A1* | 6/2012 | Haugh | | 700/295 |

OTHER PUBLICATIONS

Beck, Y.; Bishara, B.; and Medini, D., "Connecting an Alternative Energy Source to the Power Grid by a DSP Controlled DC/AC Inverter", Jul. 2005, Inaugural IEEE PES 2005 Conference and Exposition in Africa, p. 120-124.*

Nayar, C.; Ashari, M.; and Keerthipala, W., "A Grid-Interactive Photovoltaic Uninterruptible Power Supply System Using Battery Storage and a Back Up Diesel Generator", Sep. 2000, IEEE Transactions on Energy Conversion, vol. 15, No. 3, p. 348-353.*

Ying-Zi, L.; Jin-Cang, N.; Ru, L.; and Zhi-Jian, J., "Optimal Control for Dynamic Grid-Connected Photovoltaic System Based on Markov Chain", Oct. 2007, Proceeding of Intl Conference on Electrical Machines and Systems, p. 227-231.*

Chang, L.; Liu, Z.; Xue, Y.; and Guo, Z., "A Novel Buck-Boost Inverter for Photovolaic Systems", Aug. 2004, Canadian Solar Buildings Conference, Montreal, Canada.*

Meza, C.; Biel, D.; Negroni, J.; and Guinjoan, F., "Boost-Buck Inverter Variable Structure Control for Grid-Connected Photovoltaic Systems with Sensorless MPPT", Jun. 2005, IEEE ISIE, IEEE Xplore Digital Library.*

Walker, G.R.; and Sernia, P.C., "Cascaded DC-DC Converter Connection of Photovoltaic Modules", Jul. 2004, IEEE Transactions on Power Electronics, vol. 19, No. 4.*

Nayar, C. V., et al., "A Grid-Interactive Photovoltaic Uninterruptible Power Supply System Using Battery Storage and a Back-Up Diesel Generator," Energy Conversion, IEEE Transaction on, vol. 15, Issue 3, Sep. 2000, pp. 348-353.

Beck, Y., et al., "Connecting an Alternative Energy Source to the Power Grid by a DSP Controlled DC/AC Inverter," Power Engineering Society Inaugural Conference and Exposition in Africa, IEEE, Jul. 2005, pp. 120-124.

Ying-Zi, Li, et al., "Optimal Control for Dynamic Grid Connected Photovoltaic System Based on Markov Chain," Electrical Machines and Systems, 2007, ICEMS International Conference on, pp. 227-231.

Fakham, H., et al., "Control System and Power Management for a PV Based Generation Unit Including Batteries," Electrical Machines and Power Electronics, 2007, ACEMP '07, International Aegean Conference on, pp. 141-146.

El-Tamaly, H. H., et al., "Optimal Operation of Photovaltaic/Utility Grid Interconnected Electrical Power System Using Neural Network," Power Tech, 2005 IEEE Russia, pp. 1-6.

U.S. Appl. No. 13/368,817.

Assogba, Yannick et al., "Mycrocosm: Visual Microblogging", Proceedings of the 42nd Hawaii International Conference on System Sciences, 2009, 10 pages.

Gaonkar, Shravan et al., "Micro-Blog: Sharing and Querying Content Through Mobile Phones and Social Participation", http://www.cs.duke.edu/~lpcox/romit-microblog.pdf, Proceedings of the 6th international conference on Mobile systems, applications, and services (MobiSys'08), Breckenridge, Colorado, Jun. 17-20, 2008, 13 pages.

Lennon, Joe, "Leveraging pureXML in a Flex microblogging application, Part 2: Building the application user interface with Flex", IBM Corporation, http://public.dhe.ibm.com/software/dw/xml/x-db2mblog2/x-db2mblog2-pdf.pdf, Oct. 20, 2009, 25 pages.

Mayernik. Matthew et al., "Microblogging from the field: capturing contextual information in highly mobile research", http://research.cens.ucla.edu/events/2009/08/28/mayernik_pepe.pdf, University of California, Los Angeles, printed Feb. 14, 2012, 33 pages.

Owigar, J. A., et al., "Mobile Blogging System", 2008 Third International Conference on Broadband Communications, Information Technology & Biomedical Applications, Nov. 23-26, 2008, pp. 164-168, Abstract only, 1 page.

Passant, Alexandre et al., "Microblogging: A Semantic and Distributed Approach", http://www.semanticscriptng.org/SFSW2008/papers/11.pdf, National University of Ireland, Galway, 2008, 12 pages.

U.S. Appl. No. 12/476,391.

U.S. Appl. No. 12/477,482.

U.S. Appl. No. 12/498,624.

* cited by examiner

DISTRIBUTED GRID-INTERACTIVE PHOTOVOLTAIC-BASED POWER DISPATCHING

BACKGROUND

This written description is in the field of distributed local power sources such as, for example, solar panels or wind turbines distributed among a plurality of houses or other buildings. More particularly, the description relates to using surplus power of the distributed local power sources.

With the high cost of oil, people are looking for renewable energy such as solar power, wind, micro-hydropower and other distributed sources. Some people have already installed solar power or wind power at their homes or businesses. These distributed sources may collectively provide a substantial amount of reserve and excess power to a power distribution system.

BRIEF SUMMARY

Embodiments provide systems, methods and media for using surplus power of a plurality of distributed sources. One embodiment is a system for using power from distributed sources located at sites coupled to a power grid and also coupled to a computer communications network. The system comprises a power source at each of a plurality of sites coupled to the power grid. A power source generates electrical power from another form of energy at the site, such as, for example, solar energy or wind energy. The system further comprises a computer located at the site. The computer is in communication with a computer at a utility plant through the computer communications network. The computer controls an amount of power delivered from the site to the power grid by controlling an output AC (Alternating Current) voltage of a converter. The system further comprises a converter for producing an output AC voltage and an output AC current that is a function of the output AC voltage to deliver power to the grid derived from power produced by the power source at the site. The power delivered to the grid increases when the output AC voltage increases and decreases when the output AC voltage decreases. The amount of power provided to the grid during a specified time of day is determined according to an agreement between a user of the site and the utility.

Another embodiment is a computer system coupled to a computer communications network for using power from distributed sources at sites coupled to a power distribution system and coupled to the computer communications network. The embodiment comprises a memory and a computer processor. The memory stores power provision terms of an agreement between a utility and a user of the site. The terms comprise an amount of power to be supplied by a site and a time duration during which the power is to be supplied. The memory also stores a numerical value of an amount of surplus power available from a site. The computer processor is to determine an amount of power to be supplied by a site and a time duration during which the power is to be supplied. The computer processor is also to monitor a site to determine if the site is supplying the power during the prescribed time.

One embodiment is a method to provide power produced by sources located at sites distributed over a geographical area to a power distribution system. The method comprises storing at a location of a utility, configuration information about each of a plurality of sites. The configuration information comprises an amount of surplus power available from the site. The method further comprises storing power provision terms of agreements between the utility and each of a plurality of the sites. The power provision terms comprise an amount of surplus power to be delivered to the distribution system by a site and the time of day at which the amount of surplus power is to be provided. The method further comprises scheduling by a computer of the utility a time of day during which a site shall produce an agreed amount of surplus power according to the stored power provision terms.

Another embodiment is a computer program product comprising a computer useable medium having a computer readable program, wherein the computer readable program when executed on a computer causes the computer to perform operations for using distributed power sources. The operations comprise storing at a location of a utility, configuration information about each of a plurality of sites. The configuration information comprises an amount of surplus power available from a site. The operations further comprise storing power provision terms of agreements between the utility and each of a plurality of the sites. The power provision terms comprise an amount of surplus power to be delivered to the distribution system by a site and the time of day at which the amount of surplus power is to be provided. The operations further comprise scheduling by a computer of the utility a time of day during which a site shall produce an agreed amount of surplus power according to the stored power provision terms. The operations may further comprise reducing an amount of power produced at a location of the utility in proportion to an amount of power received from the distributed sources.

BRIEF DESCRIPTION OF THE SEVERAL VIEWS OF THE DRAWINGS

Aspects will become apparent upon reading the following detailed description and upon reference to the accompanying drawings in which like references may indicate similar elements.

DETAILED DESCRIPTION OF EMBODIMENTS

The following is a detailed description of example embodiments depicted in the accompanying drawings. The example embodiments are described in detail. However, the amount of detail offered is not intended to limit the anticipated variations of embodiments; but, on the contrary, the intention is to cover all modifications, equivalents, and alternatives falling within the spirit and scope of the appended claims. The detailed description below is designed to render various embodiments obvious to a person of ordinary skill in the art.

Systems, methods and media for using surplus power of distributed power sources are disclosed. In one embodiment, each of a plurality of sites may produce surplus power. All, or a fraction of, the surplus power may be supplied to the power grid according to an agreement between the user of a site and an electric utility. A computer of the utility is in communication with a computer at each of a plurality of sites having a local power source. Terms of power provision that include an amount of power to be provided during a specified time of day is communicated between a site and the utility.

The growth in grid-interactive residential and small business (not utility scale) solar photovoltaic (PV) systems presents an opportunity for utilizing that capacity to meet peak production needs. In a modern PV system, sunlight is converted into electricity using photovoltaic (PV) arrays. Such arrays are becoming more commonly installed in homes. The Direct Current (DC) energy a solar panel creates can be received by an inverter which converts the DC energy into an AC voltage signal that powers the household and its appliances. Often, such as during peak sunlight, an excess of electrical power is produced by the PV arrays. This excess power may be stored in batteries located on site.

Figure 1:
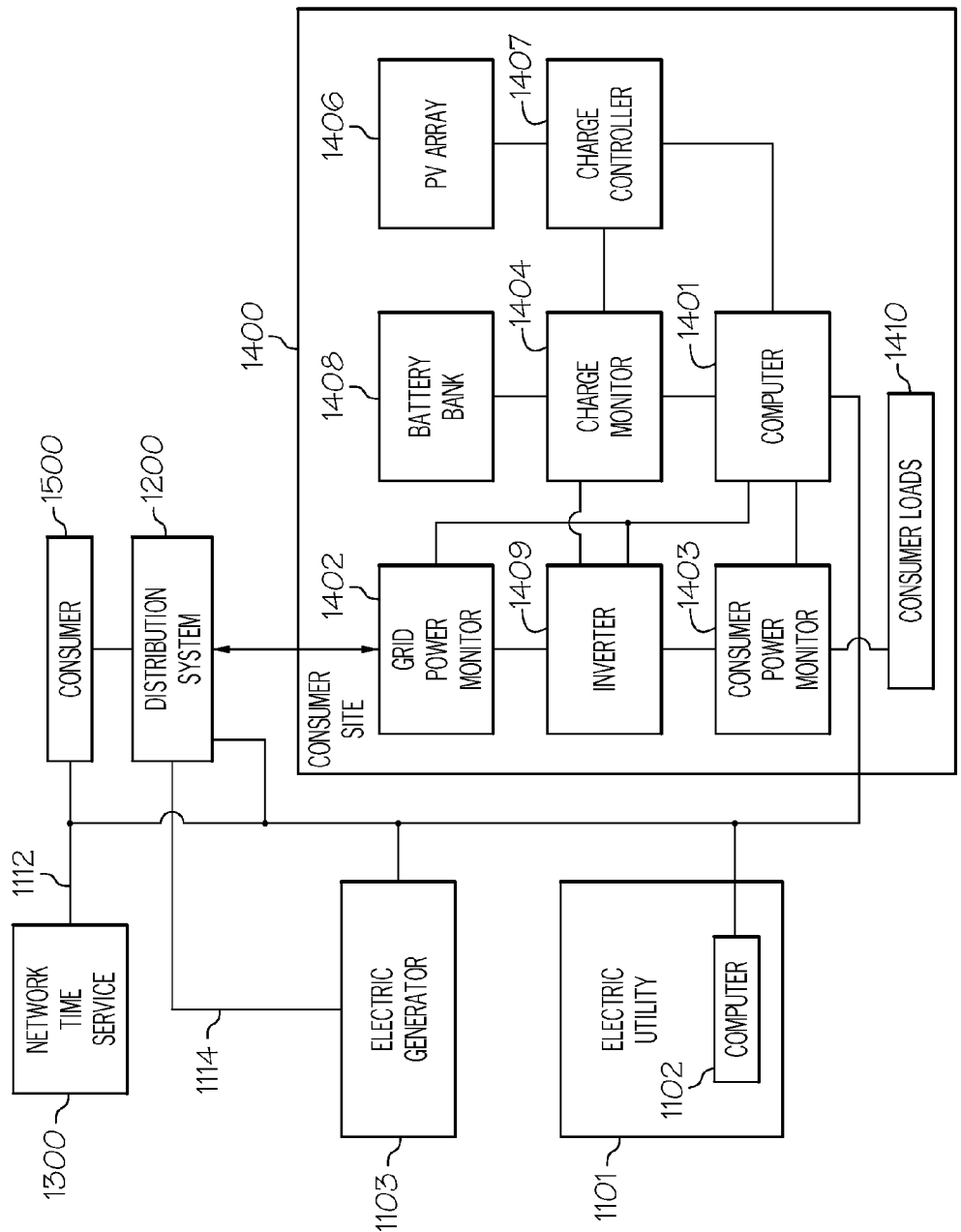
FIG. 1 depicts a power grid and a computer communications network coupled to a plurality of consumer sites and a utility site.

FIG. 1 shows a configuration in which a plurality of consumer sites 1400, 1500, which may be homes or other buildings equipped with local power sources, are coupled to a power distribution system 1200. Power distribution system 1200 receives power on transmission lines 1114 from electric generators 1103 and delivers power to the consumer sites. Also, power distribution system 1200 receives power from consumer sites and distributes power to other locations. An electric utility 1101 comprises a computer 1102 to monitor and control the distribution of power to consumer sites and controls the output of electric generators 1103.

FIG. 1 shows consumer site 1400 comprising a photovoltaic (PV) array 1406 coupled to a charge controller 1407. The output of PV array 1406 may vary widely over time in the amount of voltage and current produced. Charge controller 1407 comprises a DC to DC converter to adjust the output of PV array 1406 to a nominal DC value. Charge controller 1407 provides power from the PV array to a charge monitor 1404. Charge monitor 1404 transfers power produced by the PV array to a battery bank 1408 which stores surplus power produced by the PV array. Charge monitor 1404 also monitors the charge on the battery bank 1408. Charge monitor 1404 also provides power produced by the PV array to an inverter 1409.

Inverter 1409, (also called a converter herein), converts the DC power received from charge monitor 1404 to an Alternating Current (AC) waveform compatible with the power of the electric distribution system 1200. Inverter 1409 delivers or receives power to or from a grid power monitor 1402 coupled to the distribution system 1200. Inverter 1409 also supplies power to consumer loads 1410 within the site by way of consumer power monitor 1403. Consumer loads 1410 may comprise, for example, an air conditioning unit, household appliances and lighting.

Consumer site 1400 also comprises a computer 1401 which is coupled to a computer communications network 1112 such as the Internet. Computer 1401 receives information concerning the output of PV array 1406 from charge controller 1407. Computer 1401 receives information concerning the charge of the batteries 1408 from charge monitor 1404; information concerning the power flowing to and from grid power monitor 1402, and information concerning power flowing to consumer loads 1410 from consumer power monitor 1403. Computer 1401 also controls the operation of inverter 1409. For example, computer 1410 may control the output voltage of inverter 1409. Not shown in FIG. 1 is a memory of the computer to store information received from the various components and to store information concerning the configuration and capacity of the system of consumer site 1400. Computer 1401 also may display to the user the information received from the various aforementioned components. For example, computer 1401 may display the amount of power flowing to the distribution system as a function of time.

Computer 1401 gives a user at the consumer site 1400 control over the power he or she transmits to the grid. The computer enables the user to enter into a contract with a utility 1101 to provide a certain amount of power to distribution system 1200 during a precisely defined time interval. Utility 1101 has a computer 1102 that can communicate with computer 1401 over the network 1112 which could be the Internet. The network includes a network timing service 1300 which provides computer 1401 and computer 1102 with the precise time of day. Thus, in one embodiment, a user may sit at his or her own computer and enter into a contract with the power company specifying how much power the user will provide to the grid and at what time. In another embodiment, the power company offers terms specifying an amount of power to be provided and during what time it is to be provided and the user can indicate acceptance or rejection of these terms. In some embodiments, the power company has the ability to poll the power resources of a plurality of users coupled to the grid and determine how much power each can provide to the grid and at what times. Thus, it is advantageous to power producers to "tap" the surplus generating capacity from customers at times of peak demand by drawing from power stored in batteries. The stored power would be replaced by the customer's solar, wind or micro-hydroelectric source at a later time in the usual manner.

Thus, in one embodiment, computer 1401 will send a request over the network for information from one or more of homes and businesses (consumer sites) coupled to the network that have distributed power sources such as solar power. This information solicited from a residential unit or business unit may include: an amount of power stored by the batteries of the unit, an amount of power the customer has agreed to provide, and a time interval during which the customer agrees to supply an amount of power. Each polled home computer will report its information to computer 1102 of utility 1101. Utility computer 1102 then knows how much power is available to the grid from the houses during any time interval.

Thus, grid-interactive solar photovoltaic power systems, small wind turbines, and small scale ("micro") hydroelectric generation may include DC power storage capacity in excess of what the system's owner requires for their own backup power needs. Additionally, the design of grid-interactive systems requires excess power production ability to be present to meet the inrush current requirements for inductive motor startup, as well as surplus capacity for power production which is not being utilized by their owner, except for short periods of time, such as when the owner operates a blow dryer (1500 w), toaster oven (2000 w) or other major appliance. So, present embodiments avoid or reduce the use of high cost peaking power plants, such as natural gas turbines, to provide capacity to the grid. Embodiments described herein solve one of the greatest complaints about solar power: that it cannot be dispatched as reliable electric power production. Embodiments include methods and systems for obtaining status information about widely distributed and disparate sources of power and synchronizing those systems such that they may be dispatched in a reliable manner.

The cost ratio between power production by PV cells, wind turbines and micro hydroelectric generation, and power storage using large battery arrays is on the order of 10 to 1 for solar (and a smaller ratio for other technologies), favoring the ability to store power. For example, a 1 kilo-Watt Hour (kWH) per day (200 watts@5 hours average insolation) panel costs approximately $1,000 at present-day prices, while a 1 kWH storage battery (80 amp-hours@12 volts nominal) costs approximately $100. These cost differences, along with the desire to have battery power as a backup during a power outage, results in customers including storage batteries when solar power is installed. However, power outages are infrequent events, so the batteries mostly just sit in a rack being given a small maintenance charge from time to time. Additionally, inverters themselves often come in a small number of sizes and may need to be oversized to provide for operation during a power outage, or simply to take advantage of the solar panel's output. This results in surplus power generating ability.

For example, a customer who has a 25 kWH "reserve" (2,000 amp-hours at 12 volts nominal, or more typically 500 amp-hours at 48 volts for system efficiency reasons) for infrequent power outage situations would be able to provide 2.5 kW at a 10% discharge rate (a widely accepted rate of discharge for storage batteries). This is well within reach of commonly deployed grid-interactive inverters. If 400 such customers were in the utility area, producing 1 megawatt-hour from a distributed customer base of PV owners would result in a cost savings of $400 to $600 per hour, based on the ability to offset peak plant production. With the growth in distributed renewable power, the ability to dispatch 10's or even 100's of megawatts of distributed power generation becomes feasible, with the cost savings providing a revenue stream for the utility and the customers.

Thus, one embodiment is a system for using power from distributed sources located at sites coupled to a power grid and also coupled to a computer communications network. The system comprises a power source at each of a plurality of sites coupled to the power grid and a computer at a site where there is a power source. A power source generates electrical power from another form of energy at the site, such as, for example, solar energy or wind energy. The computer at the consumer site is in communication with a computer at a utility plant through the computer communications network. The computer controls an amount of power delivered from the site to the power grid by controlling an output AC voltage of a converter. The system further comprises a converter for producing an output AC voltage and an output AC current that is a function of the output AC voltage to deliver power to the grid derived from power produced by the power source at the site. The power delivered to the grid increases as the output AC voltage increases and decreases as the output AC voltage decreases. The amount of power provided to the grid during a specified time of day is determined according to an agreement between a user of the site and the utility.

In some embodiments, the system further comprises a consumer power monitor at the site to monitor an amount of power delivered to the site. Some embodiments may comprise a grid power monitor to monitor the power delivered to or received from the power grid. One embodiment comprises a charge controller to receive fluctuating power from the power source and to output a more stable level of power. Embodiments may comprise a charge monitor and one or more batteries, the charge monitor to monitor a charge on the batteries. In some embodiments the computer receives proposed terms of power provision from the utility and enables a user of the site to accept or reject the received proposed terms. The computer may further enable the user of the site to propose terms of power provision to the utility. The computer may further determine an amount of power delivered to the grid and report the determined amount of power to the utility.

Another embodiment is a computer system located at a utility site that is coupled to a computer communications network. The embodiment performs functions to manage the excess power of the distributed sites according to the agreements between the utility and the consumers at the sites. The embodiment comprises a memory and a computer processor. The memory stores power provision terms of an agreement between a utility and a user of the site. The terms comprise an amount of power to be supplied by a site and a time duration during which the power is to be supplied. The memory also stores a numerical value of an amount of surplus power available from a site. The computer processor is to determine an amount of power to be supplied by a site and a time duration during which the power is to be supplied. The computer processor is also to monitor a site to determine if the site is supplying the power during the prescribed time. Note that the proposed power provision terms may comprise an amount of power to be provided that is a specified fraction of the surplus power of a site. The computer processor may execute instructions to accept or reject terms proposed by a user of a site.

Figure 2:
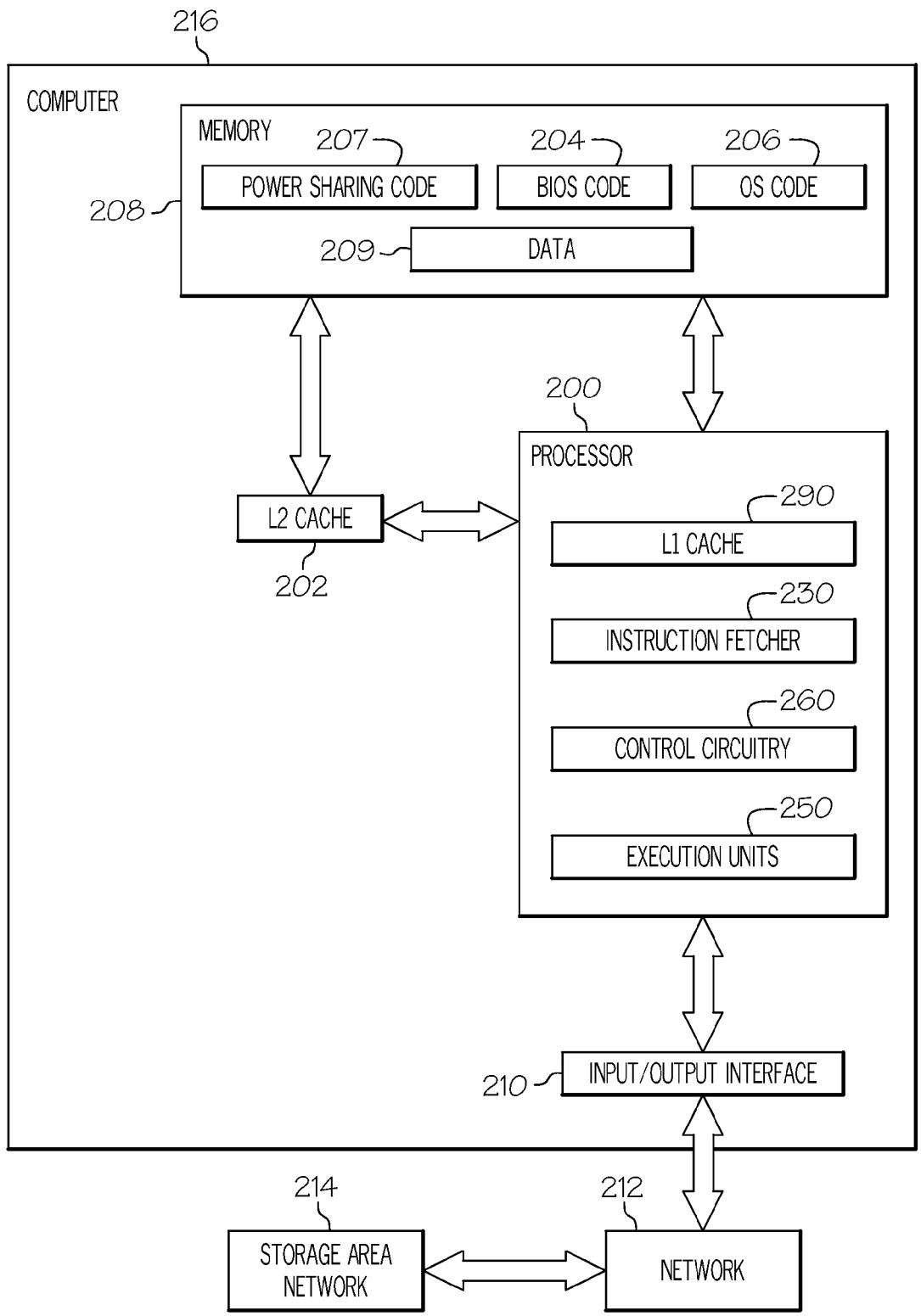
FIG. 2 depicts an embodiment of a computer for executing power sharing software.

FIG. 2 shows a computer 216 for setting up, allocating, monitoring and controlling power of one or more distributed sources. Computer 216 comprises at least one processor 200 that can operate according to BIOS (Basis Input/Output System) Code 204 and Operating System (OS) Code 206. The BIOS and OS code is stored in memory 208. The BIOS code is typically stored on Read-Only Memory (ROM) and the OS code is typically stored on the hard drive of server 216. Digital system 216 comprises a level 2 (L2) cache 202 located physically close to processor 200. Memory 208 also stores other programs for execution by processor 200 and stores data 209.

In an embodiment, memory 208 stores power sharing control code 207 to control sharing of surplus power of a consumer site in the case of a computer located in the home, and to control the provision of power to the grid from a plurality of sites in the case of a computer located at the power plant. In the case of a consumer site computer, computer code 207, when executed by processor 200 of computer 216 will cause computer 216 to perform functions that may include: reading sensors to determine array output power, battery power, power flowing to the grid and power flowing to the home, and controlling whether and when to let power flow to the grid. Other functions of the home computer may include: receiving and displaying web pages of the power plant computer which may function as a server to the plurality of computers distributed in the network. For example, the home computer may receive data concerning a price to be paid to the site owner for delivering from the site to the grid a certain amount of power during a specified time interval.

In the case of a computer at an electric power producing plant, computer code 207, when executed by processor 200 of computer 216, will cause computer 216 to perform functions that may include: polling each site in the network by sending a signal that signifies a request for data from the site concerning the power available from the site, receiving the requested data, calculating a total power available from a plurality of sites in the network, and verifying an amount of power from any one or more sites. Thus, for example, in a setup phase of operation, each site computer that can store a surplus of power derived from sunshine or wind, will inform the utility computer how much power it is able and willing to provide and when the power will be provided. For example, because of the amount of surplus power that a home is able to store in batteries, the site may be able to provide 2.5 kWH for 12 hours each day to the grid. In one embodiment, utility computer 1102 solicits information from site computer 1401 concerning how much power is actually being provided by the site at any given time.

Processor 200 comprises an on-chip level one (L1) cache 290, an instruction fetcher 230, control circuitry 260, and execution units 250. Level 1 cache 290 receives and stores instructions that are near to time of execution. Instruction fetcher 230 fetches instructions from memory. Execution units 250 perform the operations called for by the instructions. Execution units 250 may comprise load/store units, integer Arithmetic/Logic Units, floating point Arithmetic/Logic Units, and Graphical Logic Units. Each execution unit comprises stages to perform steps in the execution of the instructions fetched by instruction fetcher 230. In a superscalar architecture, different execution units operate in parallel. Thus, execution units 250 comprise a set of units of different types operating in parallel to execute instructions to implement an encryption key management process.

Control circuitry 260 controls instruction fetcher 230 and execution units 250. Control circuitry 260 also receives information relevant to control decisions from execution units 250. For example, control circuitry 260 is notified in the event of a data cache miss in the execution pipeline to process a stall.

Computer 216 also typically includes other components and subsystems not shown, such as: a Trusted Platform Module, memory controllers, random access memory (RAM), peripheral drivers, a system monitor, a keyboard, a color video monitor, one or more flexible diskette drives, one or more removable non-volatile media drives such as a fixed disk hard drive, CD and DVD drives, a pointing device such as a mouse, and a network interface adapter, etc. Processor 200 may also communicate with a network 212 by way of Input/Output Device 210. The network connects computer 216 with a storage area network of physical memory storage devices 214. These devices may include tape drive storage or hard disk arrays or other types of memory.

Thus, in one mode of operation of computer 216, the L2 cache receives from memory 208 data and instructions expected to be processed in the processor pipeline of processor 200. L2 cache 202 is fast memory located physically close to processor 200 to achieve greater speed. The L2 cache receives from memory 208 the instructions for a plurality of instruction threads. Such instructions may include load and store instructions, branch instructions, arithmetic logic instructions, floating point instructions, etc. The L1 cache 290 is located in the processor and contains data and instructions preferably received from L2 cache 202. Ideally, as the time approaches for a program instruction to be executed, the instruction is passed with its data, if any, first to the L2 cache, and then as execution time is near imminent, to the L1 cache.

Execution units 250 execute the instructions received from the L1 cache 290. Each of the units of execution units 250 may be adapted to execute a specific set of instructions. Instructions can be submitted to different execution units for execution in parallel. Data processed by execution units 250 are storable in and accessible from integer register files and floating point register files (not shown.) Data stored in these register files can also come from or be transferred to on-board L1 cache 290 or an external cache or memory. The processor can load data from memory, such as L1 cache, to a register of the processor by executing a load instruction. The processor can store data into memory from a register by executing a store instruction. Thus, the memory of a computer may comprise Read-Only-Memory (ROM), cache memory implemented in DRAM and SRAM, a hard disk drive, CD drives and DVD drives. A computer has its own memory and may control access to other memory such as tape drives and hard disk arrays.

Thus, the computer 1401 operating at a consumer site 1400 and executing power sharing code may perform the following functions: monitoring consumer site load, monitoring power flowing to the site, monitoring power flowing to or from the grid, monitoring the state of charge on the batteries and battery capacity, monitoring and controlling the inverters on site, increasing or decreasing power available to the grid, receiving time information from the network time service, receiving commands and information from the utility computer, and providing information to the utility. The computer 1102 operating at a utility site 1101 and executing power sharing code may perform the following functions: polling consumer sites for information, receiving information from consumer sites concerning each site's configuration including battery storage capacity and PV array capacity, receiving information from consumer sites concerning each site's available power and load, and instructing a consumer site to provide a certain agreed amount of power during a specified time interval.

Figure 3A:
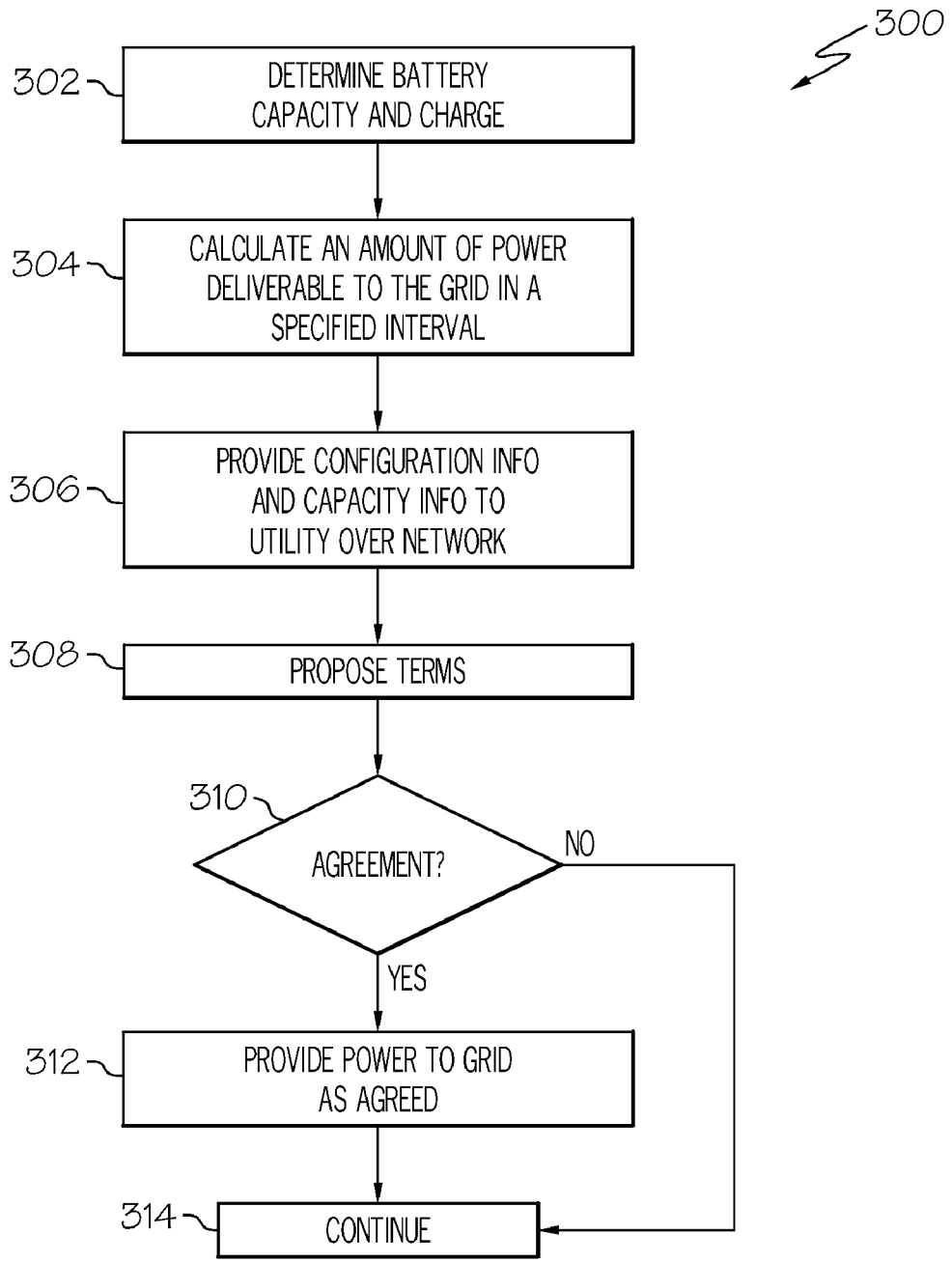
FIG. 3A depicts a flowchart of an embodiment for determining proposed power provision terms and for providing power according to agreed-upon terms.

FIG. 3A shows an embodiment of a flow chart 300 for providing power from a consumer site to a grid. The computer at the consumer site determines the local power system configuration which includes the capacity of batteries and may also include information concerning the configuration of PV arrays. The computer also determines the charge on the batteries (element 302). From the configuration information, the computer at the consumer site can calculate an amount of surplus power available to be delivered to the grid in a specified time interval (element 304). In one embodiment, the consumer at the consumer site uses this information to determine proposed terms comprising an amount of power and a time interval that the power will be provided. In another embodiment, the utility company will propose such terms (element 308). If there is an agreement between the utility company and the consumer to provide a specific amount of power during a specific time interval, (element 310), then the system provides the power to the grid as agreed (element 312) and the process continues (element 314). If there is not an agreement, the process continues without providing power to the grid.

Figure 3B:
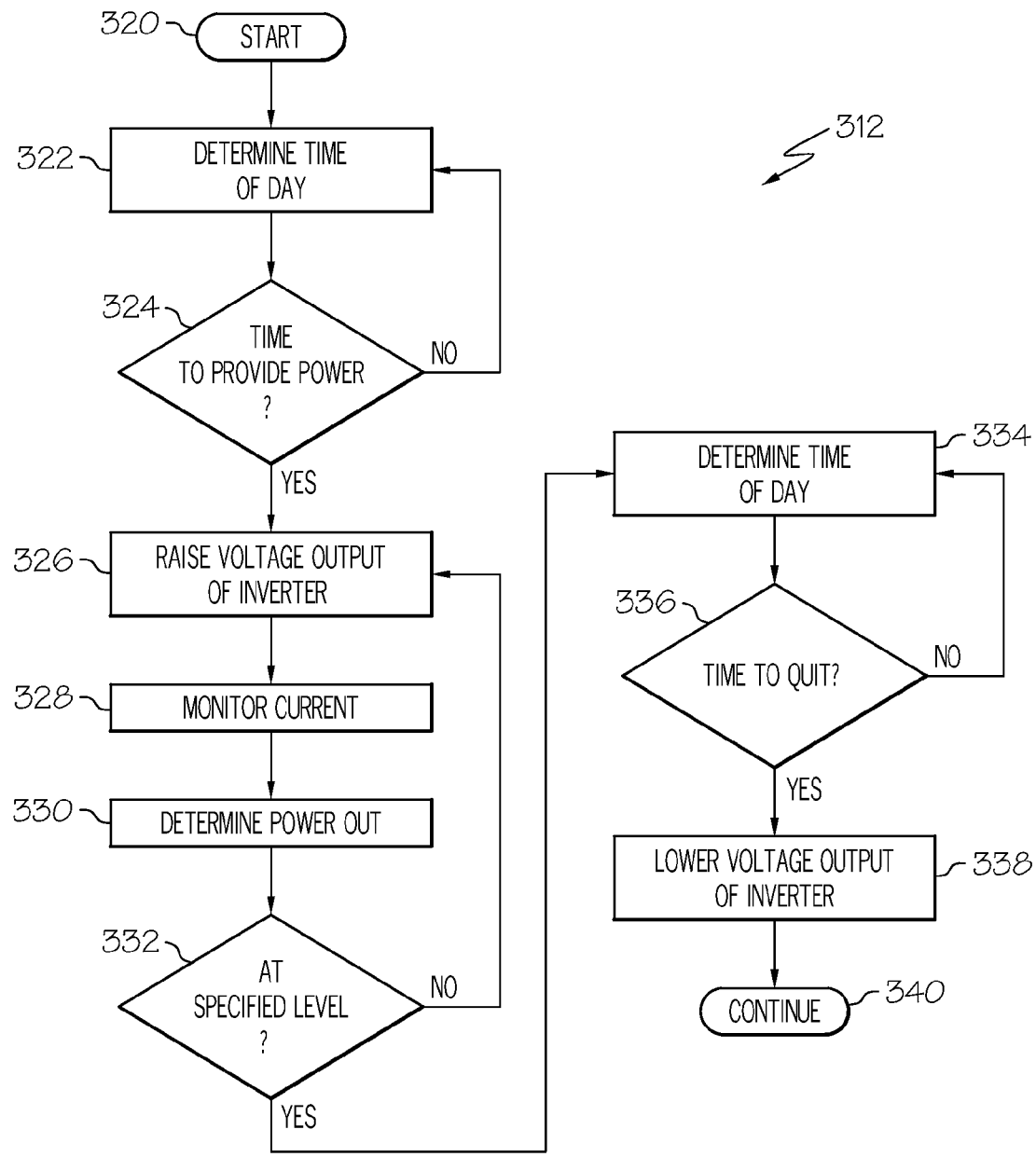
FIG. 3B depicts a flowchart of an embodiment for providing power during a specified time interval.

FIG. 3B shows a flow chart 312 that gives more detail about the process of providing power to the grid according to an agreement to provide a specified power level during a given period of time. The process starts at element 320. The computer at the consumer site determines the time of day (element 322) from the network. The computer determines if it is time to provide power as agreed (element 324). If not, the computer continues to monitor time of day (element 322). If it is time to provide the power (element 324), then the computer instructs the inverter to raise its output power level to the grid (element 326). As it does this, the computer monitors the current flowing to the grid as determined by a grid power monitor (element 328). Given the voltage and current, the computer computes the amount of power flowing to the grid (element 330). If the power output is not at the specified power level (element 332), then the computer causes the inverter to raise the voltage level further (element 326). Once the power output to the grid is at the specified level (element 332), the computer monitors the time of day (element 334). If the specified time interval for providing power is not at an end (element 336), the computer continues to monitor time of day (element 334). When the specified time period ends (element 336), the computer instructs or causes the inverter to lower its output voltage to the grid until no power is being supplied to the grid (element 338). And the process continues (element 340).

Thus, one embodiment is a method to provide power produced by sources located at sites distributed over a potentially large geographical area to a power distribution system of a utility. The method comprises storing at a location of the utility, configuration information about each of a plurality of the distributed sites. The configuration information comprises an amount of surplus power available from the site. The method further comprises storing power provision terms of agreements between the utility and each of a plurality of the sites. The power provision terms comprise an amount of surplus power to be delivered to the distribution system by a site and the time of day at which the amount of surplus power is to be provided. The method further comprises scheduling by a computer of the utility a time of day during which a site shall produce an agreed amount of surplus power according to the stored power provision terms.

The method may further comprise reducing an amount of power produced at a location of the utility in proportion to an amount of power received from the distributed sources. In some embodiments, the method comprises monitoring power provided by a site during a time for which power was agreed to be provided to the distribution system from the site. The method may further comprise sending power provision terms to one or more sites and determining which of the one or more sites accepts the terms sent to it. Alternatively, the method may comprise receiving the power provision terms from each of one or more sites and accepting or rejecting terms from each site.

Figure 4:
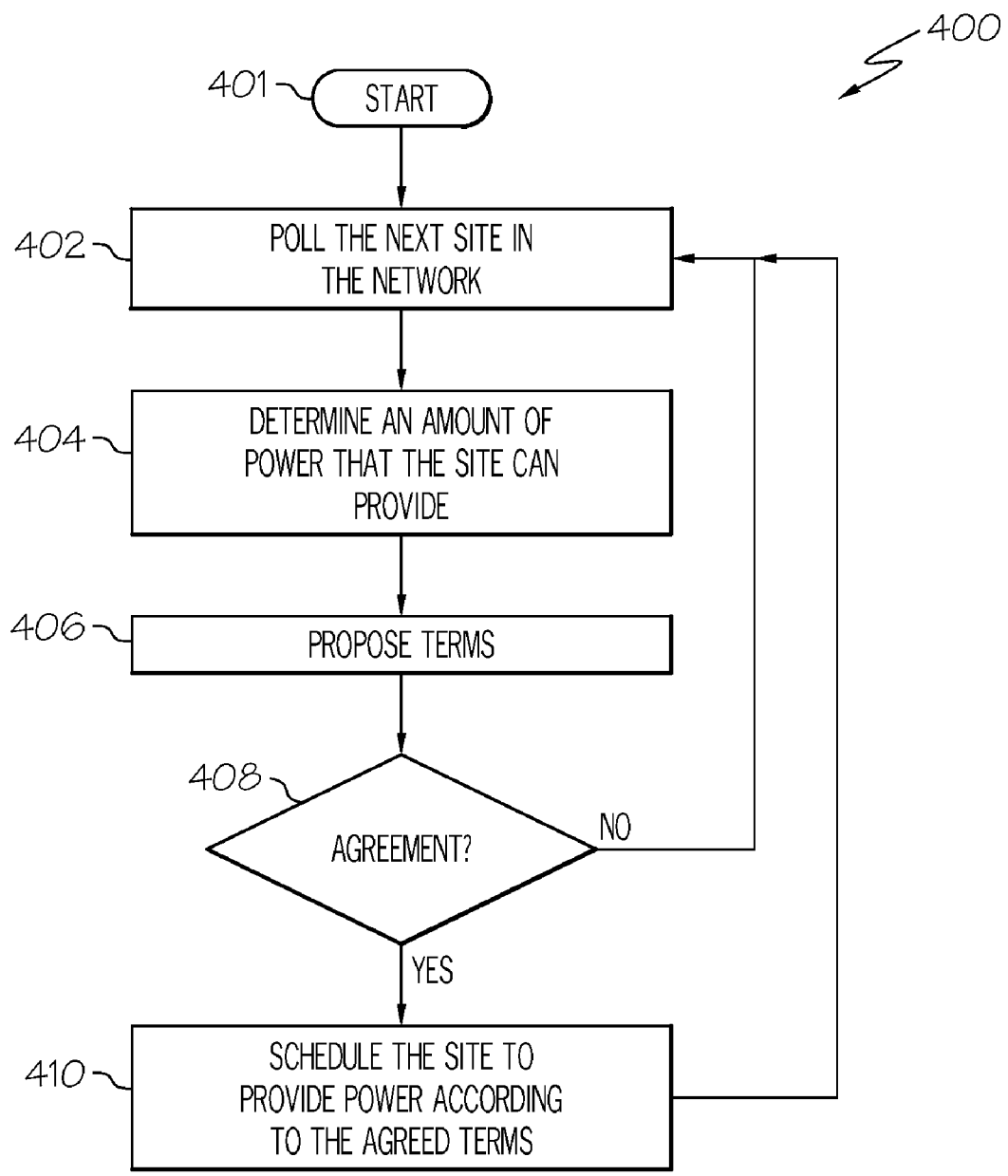
FIG. 4 depicts a flow chart of an embodiment at a utility for polling each site and determining agreed-upon power provision and scheduling power provision by a site according to the terms.

FIG. 4 shows a flowchart 400 of an embodiment of a process for determining power available from each consumer site in the network and scheduling a time for each site to provide some of its surplus power according to an agreement between the utility and each site. The process starts at element 401. The computer of the utility polls a consumer site by sending a request for information to the site over the network (element 402). Thus, the utility can acquire over the network information about each consumer site that has a computer coupled to the network. The information that the utility computer requests includes an amount of power the site can provide in a specified time interval (element 404). In one embodiment, the utility proposes terms to the consumer (element 406). In addition or in the alternative, the consumer proposes terms to the utility (element 406). If there is no agreement between the site and the utility (element 408), then the next site is polled (element 402). If there is an agreement between the site and the utility (element 408), then the utility computer schedules the site to provide power according to the agreed terms (element 410).

Thus, in some embodiments, the utility computer schedules a plurality of sites to provide a specified amount of power during a specified time of day. Each site produces its specified power precisely at the right time. For example, the utility may schedule a plurality of sites to each supply 2.5 kW from 8 am to 6 pm. If there are 100 sites providing this power, the total power provided is 0.25 MegaWatts. If there are 1000 sites providing this power, the total power provided is 2.5 MegaWatts. This results in a substantial savings in power that would otherwise have to be produced by costly conventional electric generators. Someday solar panels in almost every home will likely be a reality. Thus, by pooling surplus power from distributed power sources, the conventional electrical generators will be needed far less.

Some embodiments can take the form of an entirely hardware embodiment, an entirely software embodiment or an embodiment containing both hardware and software elements. Some embodiments are thus implemented in software, which includes but is not limited to firmware, resident software, microcode, etc. Furthermore, embodiments can take the form of a computer program product accessible from a machine accessible readable medium providing program code for use by or in connection with a computer such as shown in FIG. 2, or any instruction execution system. For the purposes of this description, a machine accessible or computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a machine accessible medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory 208 employed during actual execution of the program code, bulk storage, and cache memories 202, 290, which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Thus, another embodiment is a computer program product. The computer program product comprises a computer useable medium having a computer readable program. The computer readable program when executed on a computer causes the computer to perform operations for using distributed power sources. The operations of the computer comprise storing at a utility location, configuration information about each of a plurality of sites. The configuration information may comprise an amount of surplus power available from a site. The operations of the computer further comprise storing power provision terms of agreements between the utility and each of a plurality of the sites. The power provision terms comprise an amount of surplus power to be delivered to the distribution system by a site and the time of day at which the amount of surplus power is to be provided. The operations further comprise scheduling by a computer of the utility a time of day during which a site shall produce an agreed amount of surplus power according to the stored power provision terms. The operations may yet further comprise reducing an amount of power produced at a location of the utility in proportion to an amount of power received from the distributed sources.

Although the present embodiments and some of their advantages have been described in detail, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system for using power from distributed, renewable power sources located at sites coupled to a power grid of a utility and also coupled to a computer communications network, comprising:
   a renewable power source at a site coupled to the power grid, wherein the renewable power source generates electrical power from a renewable energy source at the site;
   a charge controller to receive the electrical power from the renewable power source and adjust the output via a DC to DC converter, wherein the electrical power varies in voltage and current, wherein the output is a nominal DC voltage, wherein the output is lowered to the nominal DC voltage in response to the electrical power comprising a high voltage, and wherein the output is raised to the nominal DC voltage in response to the electrical power comprising a low voltage;
   a computer at the site, wherein the computer at the site is in communication with a computer at a utility plant through the computer communications network, and wherein the computer at the site is to control an amount of power delivered from the site to the power grid by controlling an output AC voltage of a converter; and
   the converter for producing an output AC voltage and an output AC current that is a function of the output AC voltage to deliver power to the power grid derived from electrical power produced by the renewable power source and adjusted by the charge controller, wherein the power delivered to the power grid increases as the output AC voltage increases and decreases as the output AC voltage decreases, wherein the computer at the site is further to receive proposed terms of power provision from the utility via the computer at the utility and to enable a user of the site to accept or reject the received proposed terms, and wherein the amount of power provided to the power grid during a specified time of day is determined according to an agreement between a user of the site and the utility.

2. The system of claim 1, further comprising a consumer power monitor at the site to monitor an amount of power delivered to the site.

3. The system of claim 1, further comprising a grid power monitor at the site to monitor the power delivered to or received from the power grid.

4. The system of claim 1, further comprising a charge monitor and one or more batteries, the charge monitor to monitor a charge on the batteries.

5. The system of claim 1, wherein the computer at the site is further to enable a user of the site to propose terms of power provision to the utility.

6. The system of claim 1, wherein the computer is further to determine an amount of power delivered to the power grid and report the determined amount of power to the utility.

* * * * *